United States Patent
N et al.

(10) Patent No.: US 11,323,279 B1
(45) Date of Patent: May 3, 2022

(54) INTERNET GROUP MANAGEMENT PROTOCOL HOST MOBILITY IN ETHERNET VIRTUAL PRIVATE NETWORK MULTICAST NETWORKS

(71) Applicant: Juniper Networks, Inc., Sunnyvale, CA (US)

(72) Inventors: Vinod Kumar N, Bangalore (IN); Robert W. Kebler, Newburyport, MA (US); Vikram Nagarajan, Bangalore (IN)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 17/196,553

(22) Filed: Mar. 9, 2021

(51) Int. Cl.
H04L 12/18 (2006.01)
H04L 12/46 (2006.01)
H04L 101/622 (2022.01)
H04L 45/44 (2022.01)
(Continued)

(52) U.S. Cl.
CPC ........ H04L 12/185 (2013.01); H04L 12/4641 (2013.01); H04L 45/02 (2013.01); H04L 45/16 (2013.01); H04L 45/44 (2013.01); H04L 61/6022 (2013.01)

(58) Field of Classification Search
CPC ... H04L 12/185; H04L 45/44; H04L 61/6022; H04L 12/4641; H04L 45/02; H04L 45/16
See application file for complete search history.

(56) References Cited

U.S. PATENT DOCUMENTS

| 7,929,528 | B2 * | 4/2011 | Henry | H04L 69/18 370/389 |
| 8,428,006 | B2 * | 4/2013 | Jain | H04W 8/085 370/401 |
| 10,057,386 | B1 * | 8/2018 | Sajassi | H04L 69/08 |

(Continued)

FOREIGN PATENT DOCUMENTS

| EP | 1971086 A1 * | 9/2008 | H04L 45/50 |
| EP | 3276895 A1 | 1/2018 | |
| EP | 3367619 A1 * | 8/2018 | H04L 12/1641 |

OTHER PUBLICATIONS

Sajassi et al. "BGP MPLS-Based Ethernet VPN," RFC 7432, Internet Engineering Task Force (IETF), Feb. 2015, 56 pp.

(Continued)

Primary Examiner — Patrice L Winder
(74) Attorney, Agent, or Firm — Shumaker & Sieffert, P.A.

(57) ABSTRACT

An example network device includes memory configured to store packet data and processor circuitry coupled to the memory. The processing circuitry is configured to determine that a first host device has moved from a first access network of an Ethernet virtual private network (EVPN) associated with the first PE router to a second access network of the EVPN, wherein the first host device is interested in receiving traffic of a first multicast group. The processing circuitry is configured to determine whether any other host device on the first access network of the network device is interested in receiving traffic of the first multicast group. Based on no other host device on the first access network of the network device being interested in receiving multicast traffic of the first multicast group, the processing circuitry is configured to delete state associated with the first multicast group.

19 Claims, 5 Drawing Sheets

(51) Int. Cl.
*H04L 45/02* (2022.01)
*H04L 45/16* (2022.01)

(56) References Cited

U.S. PATENT DOCUMENTS

| | | | |
|---|---|---|---|
| 2006/0146823 A1* | 7/2006 | Ding | H04L 45/16 370/390 |
| 2008/0095134 A1* | 4/2008 | Chen | H04W 40/32 370/342 |
| 2014/0226531 A1* | 8/2014 | Farkas | H04L 12/1836 370/256 |
| 2018/0167315 A1* | 6/2018 | Kanjariya | H04L 45/02 |
| 2020/0245206 A1* | 7/2020 | Allan | H04L 45/16 |

OTHER PUBLICATIONS

Deering, "Host Extensions for IP Multicasting," RFC 1112, Network Working Group, Aug. 1989, 17 pp.
Fenner "Internet Group Management Protocol, Version 2" Network Working Group, RFC 2236, Nov. 1997, 24 pp.
Cain et al. "Internet Group Management Protocol, Version 3" Network Working Group, RFC 3376, Oct. 2002, 53 pp.
Holbrook et al., "Using Internet Group Management Protocol Version 3 (IGMPv3) and Multicast Listener Discovery Protocol Version 2 (MLDv2) for Source-Specific Multicast," Network Working Group; RFC 4604, Aug. 2006, 11 pp.
Extended Search Report from counterpart European Application No. 21177119.1 dated Dec. 6, 2021, 8 pp.

\* cited by examiner

INTERNET GROUP MANAGEMENT PROTOCOL HOST MOBILITY IN ETHERNET VIRTUAL PRIVATE NETWORK MULTICAST NETWORKS

TECHNICAL FIELD

This disclosure generally relates to computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, e.g., as if the intermediate L3 network does not exist. In particular, the EVPN transports L2 communications, such as Ethernet packets or "frames," between customer networks via the intermediate network. In a typical configuration, PE network devices (e.g., routers and/or switches) coupled to the CE network devices of the customer networks define label switched paths (LSPs) within the provider network to carry encapsulated L2 communications as if these customer networks were directly attached to the same local area network (LAN). In some configurations, the PE network devices may also be connected by Internet Protocol (IP) infrastructure in which case IP/Generic Routing Encapsulation (GRE) tunneling or other IP tunneling can be used between the network devices.

SUMMARY

In general, the disclosure describes techniques for removing unnecessary multicast traffic from an EVPN and associated provider edge (PE) router. In an EVPN, a host device may be mobile and travel from a first access network of the EVPN that is associated with a first PE router to a second access network of the EVPN. For example, the host device may move from being on an access network of one PE router to an access network of another PE router, from one port of a PE router to another port of the PE router, or from one virtual local area network (VLAN) of the PE router to another VLAN of the PE router. Conventionally, when a host device is no longer interested in particular multicast traffic or when a host device leaves one PE router, the host device sends an Internet Group Management Protocol (IGMP) leave request to the PE router which the PE router acts upon to remove any unnecessary multicast traffic associated with the host device on the PE router's access network and the PE router also acts to cease to receive any unnecessary multicast traffic associated with the host device. However, due to the nature of the EVPN emulating a LAN including multiple PE routers, a host device moving from the PE router to another of the PE routers on the LAN may not know that the host device is no longer connected to the PE router's access network. When this situation occurs, the host device may not send an IGMP leave request to the PE router, leaving the PE router with outdated state information relating to the multicast traffic. As such, unnecessary multicast traffic may end up still being sent to the PE router by an ingress PE router and the PE router may still forward this unnecessary traffic on the PE router's access network, for example, when there are no other interested host devices communicatively coupled to the access network. This is undesirable because forwarding unnecessary traffic may waste network bandwidth and resources and may negatively impact the bandwidth of other meaningful flows.

According to the techniques of the disclosure, methods, devices, and systems are described for determining that a host device has moved from an access network associated with a PE router of an EVPN and cleaning up state information for multicast groups of which a host device was interested when the host device moves to another access network of the EVPN, such as an access network of another PE router, a different port of the PE router, or a different VLAN associated with the PE router. As such, unnecessary flows may be terminated, thereby saving bandwidth and processing resources.

In one example, according to the techniques of the disclosure, a method includes: determining, by a first provider edge (PE) router of a plurality of PE routers within an Ethernet virtual private network (EVPN), that a first host device has moved from a first access network of the EVPN associated with the first PE router to a second access network of the EVPN, wherein the first host device is interested in receiving traffic of a first multicast group; determining, by the first PE router, whether any other host device on the first access network of the first PE router is interested in receiving traffic of the first multicast group; and based on no other host device on the first access network of the first PE router being interested in receiving multicast traffic of the first multicast group, deleting, by the first PE router, state associated with the first multicast group.

In another example, according to the techniques of the disclosure, a network device includes: memory configured to store packet data; and processor circuitry coupled to the memory, the processor circuitry being configured to: determine that a first host device has moved from a first access network of an EVPN associated with the network device to a second access network of the EVPN, wherein the first host device is interested in receiving traffic of a first multicast group; determine whether any other host device on the first access network of the network device is interested in receiving traffic of the first multicast group; and based on no other host device on the first access network of the network device being interested in receiving multicast traffic of the first multicast group, delete state associated with the first multicast group.

In another example, according to the techniques of the disclosure, a non-transitory computer-readable medium includes instructions that, when executed, causes a first provider edge (PE) router to: determine that a first host device has moved from a first access network of the EVPN associated with the first PE router to a second access network of the EVPN, wherein the first host device is interested in receiving traffic of a first multicast group; determine whether any other host device on the first access network of the first PE router is interested in receiving traffic of the first multicast group; and based on no other host device on the first access network of the first PE router being interested in receiving multicast traffic of the first multicast group, delete state associated with the first multicast group.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
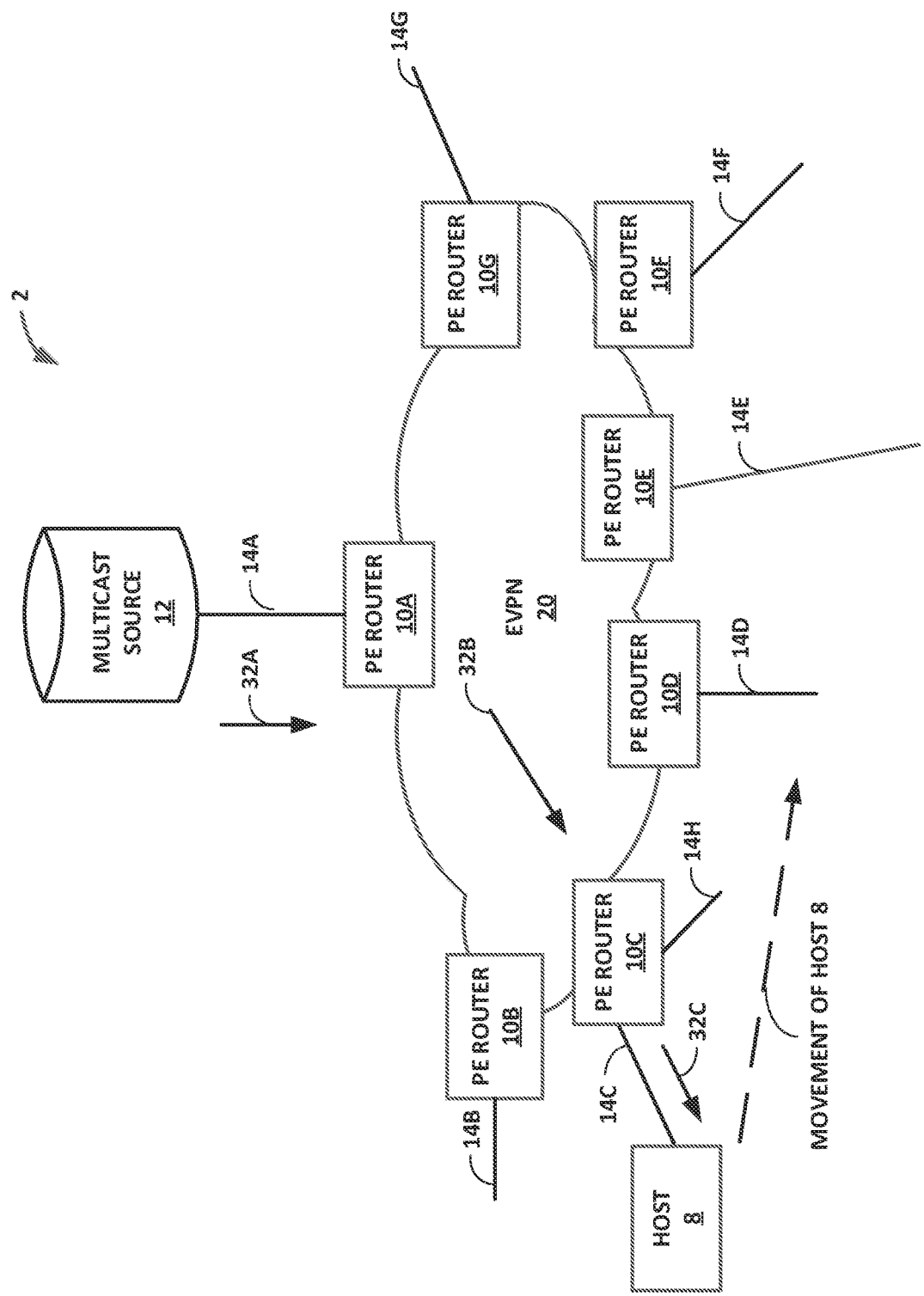
FIGS. 1A-1C are block diagrams illustrating an example EVPN in accordance with the techniques of the disclosure.
Figure 1B:
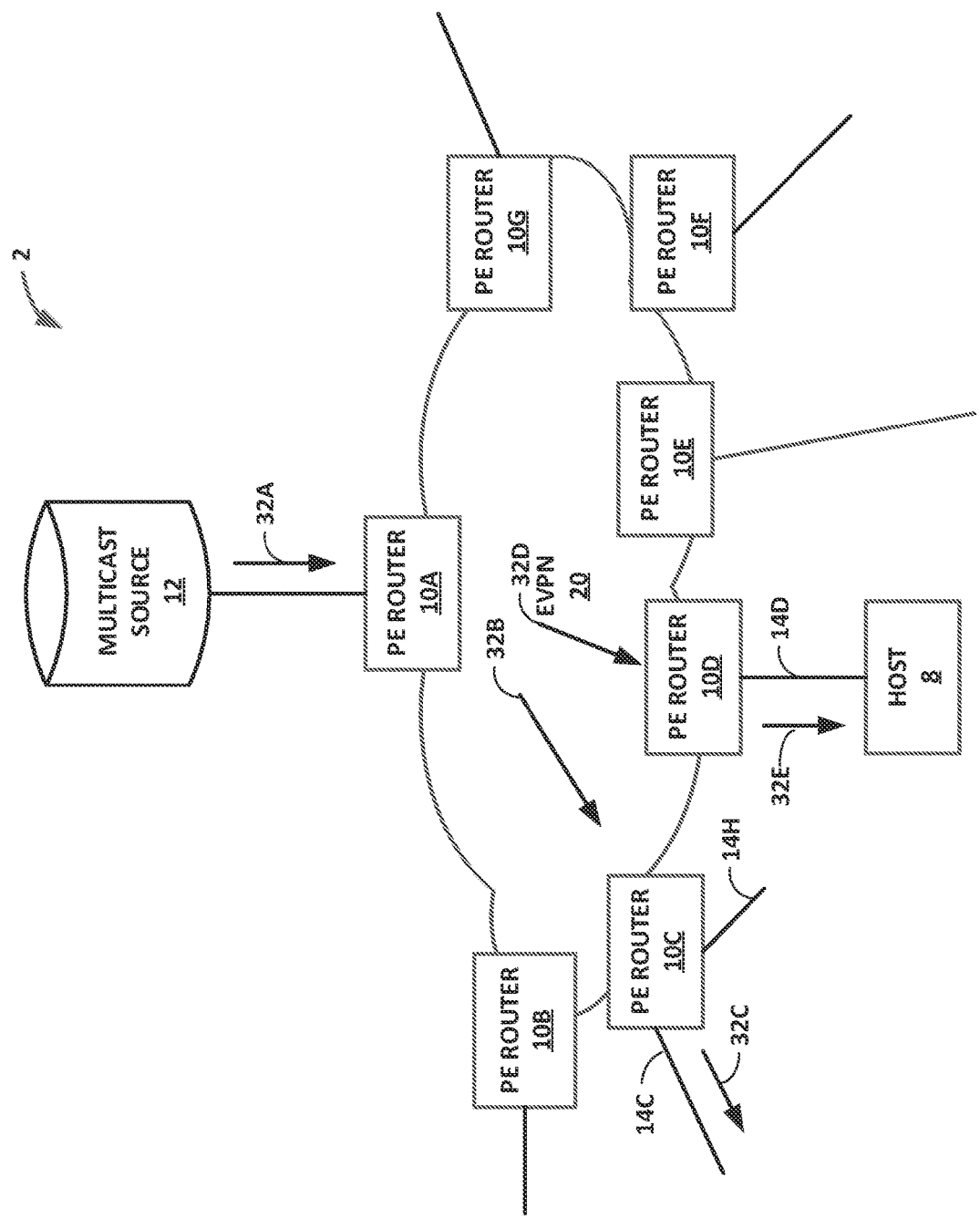
Figure 1C:
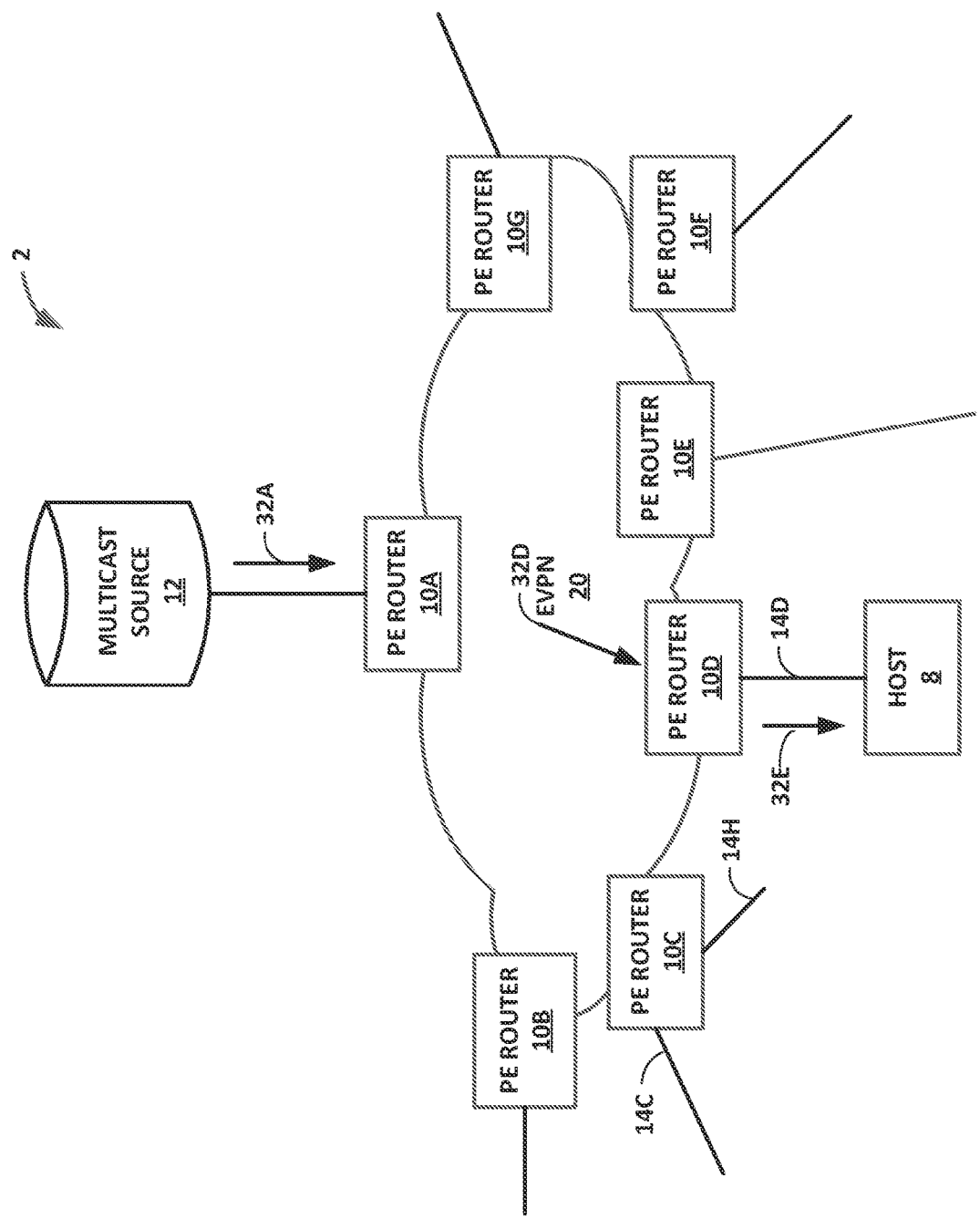

FIGS. 1A-1C are block diagrams illustrating an example EVPN in accordance with the techniques of the disclosure. EVPN 20 of FIGS. 1A-1C includes ingress PE router 10A which receives multicast traffic 32A from multicast source 12. PE routers 10B-10G are part of EVPN 20 and may be communicatively coupled to other devices through respective access networks 14A-14H. For example, each access networks 14A-14H may be any type of network, such as wireless LAN networks. In the example of FIGS. 1A-1C, PE router 10C has two access networks associated therewith, namely, access network 14C and access network 14H. In some examples, access network 14C is communicatively coupled to a different port(s) of PE router 10C than access network 14H. In some examples, access network 14C is part of a different VLAN than access network 14H.

For example, as depicted in FIG. 1A, host 8 is communicatively coupled to PE router 10C through access network 14C, for example, wirelessly. Host 8 may be an IGMP host device. PE router 10C may receive multicast traffic 32B from ingress PE router 10A, as PE router 10C may have a host device interested in the multicast traffic (sometimes referred to as a listener or an active listener), namely, host 8. PE router 10C may forward multicast traffic 32C to host 8. In this example, no host devices interested in the multicast traffic are communicatively coupled to PE router 10B or PE routers 10D-10G. As such, the multicast traffic may not be sent by ingress PE router 10A to PE router 10B or PE routers 10D-10G to save bandwidth and network resources. For example, PE routers 10A-10G of EVPN 20 may employ Internet Group Management Protocol (IGMP)-snooping and Selective Multicast Ethernet Tag (SMET) forwarding which may enable selective routing of the multicast traffic. In such cases, multicast traffic may be forwarded by an ingress PE router to only those PE routers communicatively coupled to host devices that are interested in receiving that multicast traffic, which may conserve bandwidth and network resources, as PE routers 10B and 10D-10G without host devices that are interested in receiving the multicast traffic may not receive multicast traffic from ingress PE router 10A.

In some examples, the host devices interested in receiving the multicast traffic may be "mobile" host devices. For example, the host devices, such as host 8, may move from being on access network 14C of PE router 10C to being on another access network, such as access network 14D of PE router 10D, or access network 14H of PE router 10C (for example, moving from one port of PE router 10C to another port of PE router 10C, or from one VLAN on PE router 10C to another VLAN on PE router 10C). For example, a host device may be a mobile communications device, such as a smart phone or tablet, and may move between an access network of one PE router to another access network, such as an access network of a different PE router, an access network on a different port on the same PE router, or an access network on a different VLAN of the same PE router.

These host devices may move seamlessly. For example, the hosts devices may be interested in the multicast traffic and may accordingly keep refreshing reports. In some examples, a host device may not know that the host device has migrated from an access network of one PE router to an access network of another PE router, to an access network of another port of the PE router, or to an access network of another VLAN of the PE router. In such examples, the host device may not send an IGMP leave to the original PE router through which the host device was receiving the multicast traffic. For example, the host device may be connected to the same LAN even after the host device moved from an access network of one PE router to another access network of EVPN 20 because of the emulation achieved by the EVPN 20 in which PE routers 10A-10G appear to all be on the same LAN, thereby prohibiting the host device from detecting the change.

In the example of FIGS. 1A-1C, host 8 may move from a location where host 8 is on access network 14C of PE router 10C to a location where host 8 is on access network 14D of PE router 10D (as shown in FIGS. 1B and 1C) (or, in some examples, to access network 14H of PE router 10C). For example, the EVPN may be a private network associated with a large shopping mall and host 8 may be moving about in the shopping mall such that host 8 may move from being communicatively coupled to one PE router, to another, to another, etc.

PE routers 10A-10G are illustrated as routers in the example of FIGS. 1A-1C. However, techniques of the disclosure may be implemented using switches or other suitable network devices that participate in a layer two (L2) virtual private network service, such as an EVPN. Each access network 14A-14H of each PE router 10A-10G may include customer equipment (not all shown), such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of EVPN 20 illustrated in FIGS. 1A-1C is merely an example, and other configurations may exist that still fall within the scope of this disclosure. For example, each PE router may include any number of associated access networks or the number of PE routers in EVPN 20 may be different than depicted.

EVPN 20 may include a service provider network which represents a publicly accessible computer network that is owned and operated by a service provider, which is usually large telecommunications entity or corporation. A service provider network is usually a large layer three (L3) computer network, where reference to a layer followed by a number refers to a corresponding layer in the Open Systems Interconnection (OSI) model. A service provider network may be an L3 network in the sense that the service provider network natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although additional network devices are not shown for ease of explanation, it should be understood that EVPN 20 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although elements of EVPN 20 are illustrated as being directly coupled, it should be understood that one or more additional network elements may be included such that the network elements of EVPN 20 are not directly coupled but are communicatively coupled through one or more additional network elements.

As service provider network typically provides a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by a service provider network includes EVPN service. For example, an EVPN is a service that may provide a form of L2 connectivity across an intermediate L3 network, such as a service provider network, to interconnect two L2 customer networks that may be located in two different geographic areas. Often, EVPN is transparent to the customer networks in that these customer networks are not aware of the intervening intermediate service provider network and instead act and operate as if these two customer networks were directly connected and formed a single L2 network. In a way, EVPN enables a form of a transparent LAN connection between two geographically distant customer sites that each operates a L2 network and, for this reason, EVPN may also be referred to as a "transparent LAN service." Additional example information with respect to the EVPN protocol is described in "BGP MPLS-Based Ethernet VPN," RFC7432, Internet Engineering Task Force (IETF), February 2015, available at https://tools.ietf.org/html/rfc7432, the entire contents of which is incorporated herein by reference.

To configure an EVPN, a network operator of the service provider configures various devices included within the service provider network that interface with one or more customer networks. The EVPN configuration may include an EVPN instance (EVI), which comprises one or more broadcast domains. Generally, an EVI may refer to a routing and forwarding instance on a PE router, such as PE routers 10A-10G. Consequently, multiple EVIs may be configured on PE routers 10A-10G for an Ethernet segment (ES), as further described herein, each providing a separate, logical layer two (L2) forwarding domain. In this way, multiple EVIs may be configured that each includes one or more of PE routers of an Ethernet segment. For example, one Ethernet segment may comprise a first EVI which includes PE routers 10A, 10B, 10C, and 10D, and a second EVI, which includes only PE routers 10A and 10B. In some examples, Ethernet Tags are then used to identify a particular broadcast domain, e.g., a VLAN, in an EVI. A PE router may advertise a unique EVPN label per <ESI, Ethernet Tag> combination. This label assignment methodology is referred to as a per <ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment.

FIGS. 1A-1C illustrate an EVPN environment. In typical operation, PE routers 10A-10G communicate using BGP. PE routers 10A-10G may interoperate using BGP in accordance with the techniques described in "BGP MPLS-Based Ethernet VPN," RFC7432, as referenced above.

In the example of FIGS. 1A-1C, when providing the EVPN service, PE routers 10A-10G typically perform MAC address learning to efficiently forward L2 network communications in EVPN 20. That is, as PE routers 10A-10G forward Ethernet frames, the routers learn L2 state information for the L2 network, including MAC addressing information for customer equipment, such as host 8, within the network and the physical ports through which the customer equipment are reachable. PE routers 10A-10G typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10A-10G learn the MAC address for customer equipment reachable through access networks 14A-14H, the PE routers 10A-10G utilize MAC address route advertisements of a layer three (L3) routing protocol (i.e., BGP in this example) to share the learned MAC addresses and to provide an indication that the MAC addresses are reachable through the particular PE router that is issuing the route advertisement. In the EVPN implemented using PE routers 10A-10G for a given EVI, each of the PE routers of the given EVI advertises the locally learned MAC addresses to other PE routers 10 of the EVI using a BGP route advertisement, also referred to herein as a "MAC route" or a "MAC Advertisement route." As further described below, a MAC route typically specifies an individual MAC address of customer equipment (such as host 8) along with additional forwarding information, such as a route descriptor, route target, layer 2 segment identifier, MPLS label, etc. In this way, PE routers 10A-10G use BGP to advertise and share the MAC addresses learned when forwarding layer two communications associated with the EVPN. Accordingly, PE routers 10A-10G may perform both local learning and remote learning of MAC addresses.

Network traffic from the EVPN core may be associated with a (Source, Group), i.e., (S, G), label to designate a source of the traffic and a multicast group to which the traffic belongs. PE routers of an access network (e.g., an Ethernet segment (ES)) may use Internet Group Management Protocol (IGMP) Join and Leave messages received from a customer equipment (CE) network device (i.e., a host device) to establish multicast group state for routing purposes.

For example, PE routers, such as Top-of-Rack (TOR) switches, of the access network or ES may use IGMP protocol to receive multicast group membership information from host devices or Virtual Machines (VMs). Upon receiving, from the host devices or VMs, a notification to subscribe in the membership of a particular multicast group, one or more PE routers forwards this request to a BGP EVPN using Ethernet Multicast Source Group Route NLRI (Network Layer Reachability Information). For example, the Ethernet Multicast Source Group Route NLRI may be EVPN Multicast Join Sync Route NLRI (Type-7) or EVPN SMET NLRI (Type-6). The NLRI also tracks the IGMP protocol version of a recipient as well as any source filtering for a given multicast group membership. In one example, all Ethernet Multicast Source Group Routes are announced using ES-Import Route Target extended communities. Thus, the PE routers of the Ethernet segment may route multicast network traffic to the customer equipment device based on the (S, G) label of the multicast traffic.

Additional detail of IGMP is provided within "Host Extensions for IP Multicasting", RFC 1112, Internet Engineering Task Force (IETF), August 1989, available at https://tools.ietf.org/html/rfc1112; "Internet Group Messaging Protocol, Version 2," RFC2236, Internet Engineering Task Force (IETF), November, 1997, available at https://tools.ietf.org/html/rfc2236; "Internet Group Management Protocol, Version 3," RFC3376, Internet Engineering Task Force (IETF), October 2002, available at https://tools.ietf.org/html/rfc3376; and "Using Internet Group Management Protocol Version 3 (IGMPv3) and Multicast Listener Discovery Protocol Version 2 (MLDv2) for Source-Specific Multicast," RFC4604, Internet Engineering Task Force (IETF), August 2006, available at https://tools.ietf.org/html/rfc4604; the entire contents of each of which is incorporated herein by reference.

PE routers within an EVPN may communicate such IGMP instructions by exchanging routing and forwarding information according to route Types set forth by BGP. Additional detail of BGP is provided by RFC7432, as referenced above. The standard set forth in RFC7432 sets forth the following types of BGP routes. These routes may only be used to produce ESIs that satisfy the uniqueness requirements set forth by RFC7432.

Type-0. A Type-0 route indicates an arbitrary 9-octet ESI value, which is managed and configured by the operator.

Type-1. When IEEE 802.1AX LACP is used between the PE routers and customer equipment (CE) routers, a Type-1 route indicates an auto-generated ESI value determined from LACP that includes the CE LACP System MAC address and the CE LACP Port Key. The CE router treats the multiple PE routers to which the CE router is multi-homed as the same switch. Thus, the Type-1 route allows the CE router to aggregate links that are attached to different PE routers in the same bundle.

Type-2. A Type-2 route is used in the case of indirectly connected host devices via a bridged LAN between the CE routers and the PE routers. The ESI Value is auto-generated and determined based on the Layer 2 bridge protocol. If the Multiple Spanning Tree Protocol (MSTP) is used in the bridged LAN, then the value of the ESI is derived by listening to Bridge PDUs (BPDUs) on the Ethernet segment. To achieve this, the PE router is not required to run MSTP. However, the PE router must learn the Root Bridge MAC address and Bridge Priority of the root of the Internal Spanning Tree (IST) by listening to the BPDUs. The Type-2 route includes a Root Bridge MAC address and a Root Bridge Priority.

Type-3. A Type-3 route indicates a MAC-based ESI Value that can be auto-generated or configured by the operator. The ESI Value includes a System MAC address and a Local Discriminator value.

Type-4. A Type-4 route indicates a router-ID ESI Value that can be auto-generated or configured by the operator. The ESI Value includes a Router ID and a Local Discriminator value.

Type-5. A Type-5 route indicates an Autonomous System (AS)-based ESI Value that can be auto-generated or configured by the operator. The ESI Value includes an AS number owned by the system and a Local Discriminator value.

Additionally, several additional BGP routes are discussed herein:

Type-6. A Type-6 route indicates that a PE router supports a particular extended community. A PE router may issue a Type-6 route to advertise that the PE router supports the particular extended community. In some examples, the Type-6 route includes a Subtype that identifies the particular extended community that is supported, such as IGMP proxy or Selective Multicast. Each Subtype may be a unique identifier that the Internet Assigned Numbers Authority (IANA) assigns from the EVPN Extended Community Subtypes registry. The Type-6 route may be encoded as an 8-octet value, wherein a first field defines the BGP route type as a Type-6 BGP route and a second field defines a subtype of the Type-6 route. The remaining bits are reserved.

For example, a PE router may implement the IGMP Proxy extended community. When advertising an ES route for a particular ES, a PE router that supports IGMP proxy on the ES attaches the Type-6 route to the ES route to advertise its support for the IGMP Proxy extended community. Because all PE routers attached to a given ES must coordinate IGMP Join (x, G) state, all PE routers attached to a given ES must support IGMP proxy before the ES may activate IGMP proxy. An RFC7432 compliant PE router does not advertise a Type-6 route. Thus, the absence of a Type-6 route in an ES route advertisement indicates that the advertising PE router does not support IGMP proxy.

According to the techniques of this disclosure, a PE router may implement a Host Mobility extended community. The Host Mobility extended community may carry a sequence number that may be associated with a particular host device. This sequence number may be incremented when a host device moves from one access network to another access network. By tracking the host device MAC address and associated sequence numbers, a PE router may determine when a host device moves from one access network to another. When advertising an ES route for a particular ES, a PE router that supports the Host Mobility extended community on the ES attaches the Type-6 route to the ES route to advertise its support for the Host Mobility extended community. The Type-6 route may include a MAC address and a sequence number associated with a host device. An RFC7432 compliant PE router does not advertise a Type-6 route. Thus, the absence of a Type-6 route in an ES route advertisement indicates that the advertising PE router does not support the Host Mobility extended community.

As another example, a PE router may implement the Selective Multicast extended community. A PE router that supports Selective Multicast on a given [EVI, BD] must attach this extended community to an Inclusive Multicast Ethernet Tag route that the PE router advertises for that [EVI, BD]. An RFC7432 compliant PE router does not advertise a Type-6 route. Thus, the absence of a Type-6 route in an ES route advertisement indicates that the advertising PE router does not support Selective Multicast.

Type-7. A Type-7 BGP route, also referred to as a BGP multicast join synch route, is used for coordinating or synchronizing a multicast group join request amongst PE routers of an ES. In other words, an EVPN may use a Type-7 route to coordinate the IGMP Join (x,G) state for a given [EVI, BD] between each of the PE routers attached to a given ES when operating in either single- or all-active redundancy mode. The Type-7 route indicates that a PE router has received an IGMP join request to join a multicast group on the ES. When one of the PE routers receives an IGMP join report on the ES from the CE router, it sends out a BGP Type-7 route with the ESI value. Each additional multi-homed PE router on the Ethernet Segment imports the Type-7 route and based on the Type-7 route, syncs its IGMP state. The PE router that is the designated forwarder (DF) forwards multicast traffic from the EVPN core to the CE router, while other PE routers that are not the DF drop the traffic. Because the states of the PE routers are synchronized via the Type-7 route, if the DF goes offline, another PE router may immediately take over as the DF and continue forwarding traffic to the CE device.

In the example of FIGS. 1A-1C, if PE router 10C, for example, receives an IGMP join report on the ES from host 8, it sends out a BGP Type-7 route with the Ethernet Segment Identifier (ESI) value. PE router 10C forwards multicast traffic 32C from the EVPN 20 to host 8 through access network 14C.

Each of PE routers 10A-10G utilizes MAC routes specifying the MAC addresses learned by other PE routers to determine how to forward L2 communications to MAC addresses that belong to customer equipment connected to other PEs, e.g., to remote CE routers and/or customer equipment communicatively coupled to PE routers. That is, each of PE routers 10A-10G determine whether Ethernet frames can be sent directly to a particular one of the other PE routers 10 or whether to treat the Ethernet frames as so called "BUM" traffic (Broadcast, Unidentified Unicast or Multicast traffic) that is to be flooded within the EVPN based on the MAC addresses learning information received from the other PE routers.

While not all shown in FIGS. 1A-1C, host devices (e.g., CE routers) may be multi- and/or singly-homed to one or more of PE routers 10A-10G. In EVPN, a CE router may be said to be multi-homed when it is coupled to two physically different PE routers on the same EVI when the PE routers are resident on the same physical ES. In instances where a given customer network may couple to a service provider network via two different and, to a certain extent, redundant links, the customer network may be referred to as being "multi-homed." Multi-homed networks are often employed by network operators so as to improve access to EVPN provided by a service provider network should a failure in one of the links.

An EVPN may operate over a Multi-Protocol Label Switching (MPLS) configured network and use MPLS labels to forward network traffic accordingly. MPLS is a mechanism used to engineer traffic patterns within IP networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using a MPLS protocol, each router along an LSP allocates a label and propagates the label to the closest upstream router along the path. Routers along the path add or remove the labels and perform other MPLS operations to forward the MPLS packets along the established path.

As shown in the example of FIGS. 1A-1C, PE routers 10A-10G may provide an MPLS core for sending network packets therebetween. Each of PE routers 10A-10G may implement the MPLS protocol and apply one or more MPLS labels, i.e., a label stack, to network packets in accordance with routing and forwarding information configured at each respective PE router. As described above, for example, ingress PE router 10A may attach an MPLS label advertised by PE router 10C to a packet that ingress PE router 10A is forwarding to PE router 10C, such that the packet is forwarded through EVPN 20 to PE router 10C.

FIG. 1B depicts the same EVPN as in FIG. 1A, however with host 8 having moved from access network 14C of PE router 10C to access network 14D of PE router 10D. Having moved to be on access network 14D of PE router 10D, host 8 may send an IGMP join report to PE router 10D so that host 8 may receive the multicast traffic from PE router 10D. PE router 10D may send a join to ingress PE router 10A. Ingress PE router 10A may then begin sending multicast traffic 32D to PE router 10D and PE router 10D may send multicast traffic 32E to host 8 via access network 14D.

However, as depicted PE router 10C may continue to receive multicast traffic 32B from ingress PE router 10A and may continue to forward traffic on access network 14C despite there being no interested host devices communicatively coupled to PE router 10C. This situation may occur because host 8 could not send out an IGMP leave to PE router 10C as host 8 has already moved to be on access network 14D of PE router 10D.

In such mobile cases, PE router 10C may not update the multicast groups for which PE router 10C is receiving multicast traffic for a relatively long period of time, for example, until a join-timeout timer expires, which may be on the order of 210 seconds. As such, unnecessary traffic (e.g., multicast traffic 32B) may be forwarded by the ingress PE router 10A to PE router 10C and PE router 10C may forward unnecessary traffic (e.g., multicast traffic 32C) on to access network 14C. This forwarding of unnecessary traffic is undesirable as this may unnecessarily increase transmission bandwidth on the access network of PE router 10C and may unnecessarily consume resources, such as packet replicating and processing resources.

Moreover, in many deployments, the access interface bandwidth may be limited to a few channels. Having a multicast traffic flow being forwarded without interested host devices may negatively impact the bandwidth of other meaningful flows, thus negatively affecting overall user experience. When multiple mobile host devices (e.g., mobile communication device users) move across PE router connectivity boundaries regularly, this may result in large flows of traffic being forwarded unnecessarily, thus causing SMET forwarding and IGMP snooping to be less effective or even ineffective in preserving network resources and bandwidth.

According to the techniques of this disclosure, PE router 10C may detect that host 8 has moved from access network 14C of PE router 10C to another access network of EVPN 20. For example, PE router 10C may explicitly track host 8. PE router 10C may also, upon detecting that host 8 has moved from access network 14C to another access network of EVPN 20, clean the multicast control plane and forwarding state for the multicast group. In other words, PE router 10C may delete the IGMP snooping state leading to the withdrawal of the SMET EVPN Type-6 route and also prune off the virtual tunnel end point (VTEP) to PE router 10C at ingress router 10A for the multicast group. PE router 10C may perform checks to determine if other interested host devices are communicatively coupled to PE router 10C, for example, by explicit host device tracking or by soliciting reports by sending an IGMP LMQ query on the LAN. After ensuring that there are no other host devices interested on access network 14C of PE router 10C, PE router 10C may clean PE router 10C's state for the multicast group.

For example, PE router 10C may determine that host 8 has moved from a first access network (e.g., access network 14C) of EVPN 20 to a second access network (e.g., access network 14D). Host 8 may be interested in receiving traffic of a first multicast group. PE router 10C may determine whether any other host device on the first access network of PE router 10C is interested in receiving traffic of the first multicast group. Based on no other host device on the first access network of PE router 10C being interested in receiving multicast traffic of the first multicast group, PE router 10C may delete state associated with the first multicast group.

In this manner, PE router 10C and ingress PE router 10A may delete the state of PE router 10C (which may not have interested host devices on access network 14C), thereby stopping the needless forwarding of multicast traffic 32B from ingress PE router 10A and of multicast traffic 32C from PE router 10C on to access network 14C as is depicted in FIG. 1C.

The architecture of EVPN 20 illustrated in FIGS. 1A-1C is shown as an example. The techniques as set forth in this disclosure may be implemented in the example EVPN 20 of FIGS. 1A-1C, as well as other types of systems not described specifically herein. Nothing in this disclosure should be construed so as to limit the techniques of this disclosure to the example architecture illustrated by FIGS. 1A-1C.

An example of PE router 10C determining that host 8 has moved on is now described. For example, PE router 10C may maintain and track an IGMP host mapping database to detect when host 8 moves from access network 14C to a second access network of EVPN 20. For example, this IGMP host mapping database may include, prior to host 8 moving from access network 14C to a second access network of EVPN 20, an entry such as follows: PE router 10C: Host 8<--MAC1--> (originating PE=PE router 10C)::Sequence Num: 45323326::<Mcast-Grp-List>

PE router 10C may receive a control message from PE router 10D that includes host 8's MAC address and an associated sequence number. PE router 10C may use the MAC address and the associated sequence number to determine that host 8 has moved from access network 14C to a second access network of EVPN 20.

In some examples, the control message may be a Type-2 route. For example, the Type-2 route may include a MAC mobility community including a MAC address associated with host 8 and a sequence number associated with host 8. PE router 10C may determine that host 8 has moved to access network 14D of PE router 10D by determining that PE router 10C has received a Type-2 route from PE router 10D with a higher sequence number than a sequence number for the same MAC address stored in PE router 10C's host mapping database. For example, PE router 10C may then update PE router 10C's host mapping database as follows: PE router 10C: Host 8<--MAC1--> (originating PE=PE router 10D)::Sequence Num: 45323327:: <Mcast-Grp-List>.

In some examples, alternatively, or in addition to, using Type-2 routes with a MAC mobile community to track host 8, PE router 10C may implement a Host Mobility extended community of a Type-6 route. The Host Mobility extended community may carry a different sequence number that may be associated with a particular host device. This sequence number may be incremented when a host device moves from one access network to another access network. By tracking the host device MAC address and associated sequence numbers, a PE router may determine when a host device moves from one access network to another.

This may result in PE router 10C determining that host 8 has moved from access network 14C of PE router 10C to a second access network of EVPN 20. Based on determination, PE router 10C may perform the conditional deletion of multicast state for multicast groups requested by host 8.

Figure 2:
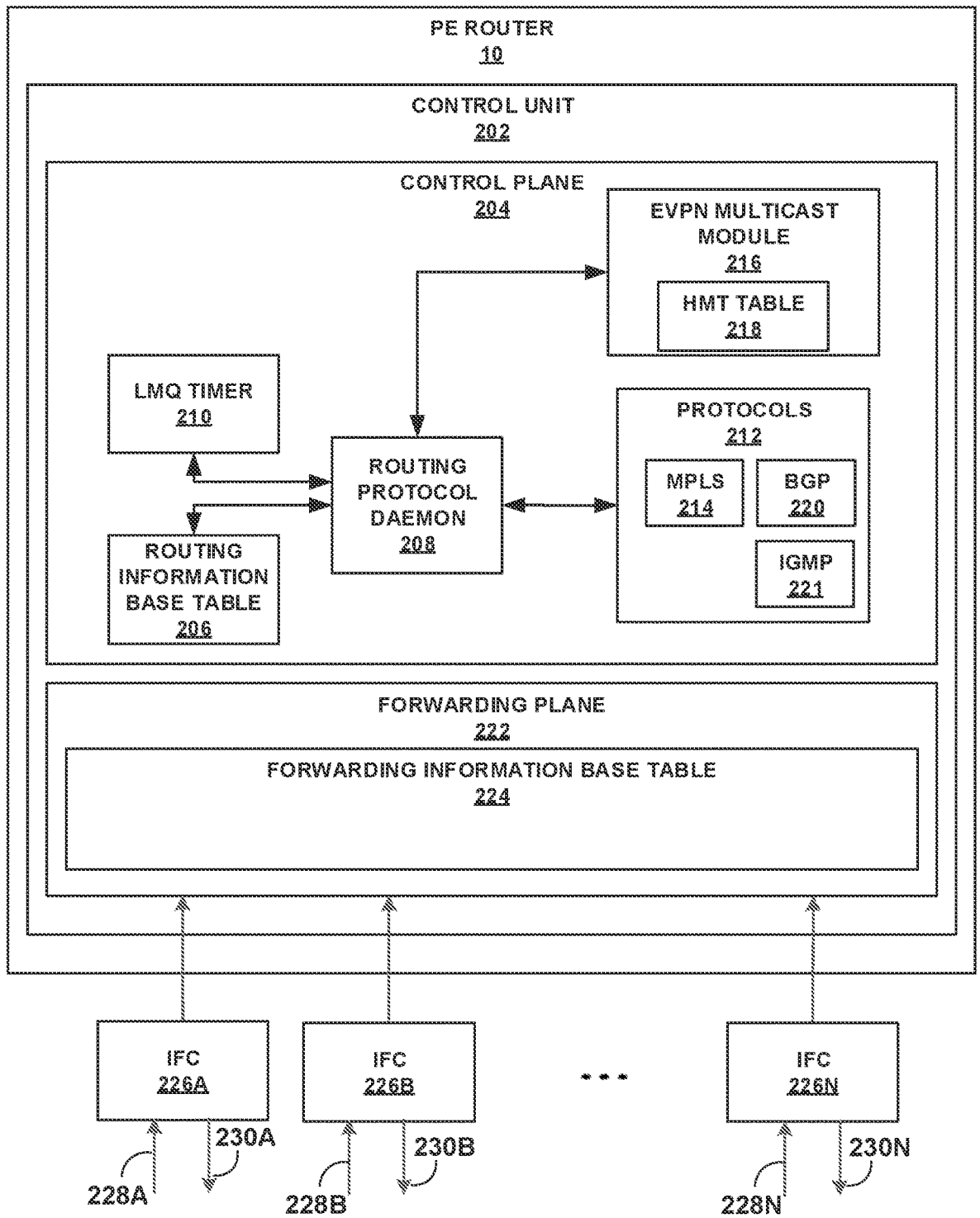
FIG. 2 is a block diagram illustrating an example provider edge router within an EVPN in accordance with the techniques of the disclosure.

FIG. 2 is a block diagram illustrating an example PE router 10 within an EVPN in accordance with the techniques of the disclosure. In general, PE router 10 may operate substantially similar to any of PE routers 10A-10G of FIGS. 1A-1C. In this example, PE router 10 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. In some examples, one or more interface port may be coupled to one or more access networks (e.g., access networks 14C and 14H). PE router 10 also includes a control unit 202 that determines routes of received packets and forwards the packets accordingly via IFCs 226.

Control unit 202 may comprise a control plane 204 and a forwarding plane 222. Control plane 204 (which may also be referred to as a routing engine) operates as the control plane for router 200 and includes an operating system that provides a multi-tasking operating environment for execution of a number of concurrent processes. Control plane 204, for example, executes software instructions to implement one or more control plane networking protocols 212. For example, protocols 212 may include one or more routing protocols, such as BGP 220, for exchanging routing information with other routing devices and for updating routing information base (RIB) table 206, Multiprotocol Label Switching (MPLS) protocol 214, and Internet Group Management Protocol (IGMP) 221.

In addition, control plane 204 communicates with other routers to establish and maintain an EVPN, such as the EVPN of FIGS. 1A-1C, for transporting L2 communications through an intermediate network so as to logically extend an Ethernet network through an intermediate network. When implementing an EVPN, L2 MAC learning may be performed in the control plane by exchanging, with remote PE devices, BGP messages containing MAC addresses. BGP protocol 220 communicates information recorded in forwarding information base (FIB) table 224 to forwarding plane 222 (also referred to as a forwarding engine). Additional example information with respect to EVPN and the BGP protocol is described in MPLS-Based Ethernet VPN," RFC 7432, as referenced above, the entire contents of which are incorporated herein by reference.

FIB table 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

FIB table 224 may include forwarding state information for each multicast group for which PE router 10 is communicatively coupled to a host that is interested in that particular multicast group. This forwarding state information may be indicative of whether there is a host communicatively coupled to PE router 10 that is interested in a multicast group. In some examples, FIB table 224 may include forwarding state information for each multicast group stored in host mobility tracking (HMT) table 218, which is described in more detail below.

RIB table 206 may describe a topology of the computer network in which PE router 10 resides, and may also include routes through the shared trees in the computer network. RIB table 206 describes various routes within the computer network, and the appropriate next hops for each route, i.e., the neighboring routing devices along each of the routes. Control plane 204 analyzes information stored in RIB table 206 and generates forwarding information for forwarding plane 222, stored in FIB table 224. FIB table 224 may associate, for example, network destinations for certain multicast groups with specific next hops and corresponding IFCs 226 and physical output ports for output links 230. FIB table 224 may be a radix tree programmed into dedicated forwarding chips, a series of tables, a complex database, a link list, a radix tree, a database, a flat file, or various other data structures.

The architecture of PE router 10 illustrated in FIG. 2 is shown as an example. The techniques as set forth in this disclosure may be implemented in the example PE router 10 of FIG. 2, as well as other types of systems not described specifically herein. Nothing in this disclosure should be construed so as to limit the techniques of this disclosure to the example architecture illustrated by FIG. 2.

IGMP host mapping database (not shown) in EVPN multicast module 216 may include HMT table 218 stored in EVPN multicast module 216. An HMT table may be maintained by each of PE routers 10B-10G. In some examples, HMT table 218 includes information such as a device under test (DUT) for each host device communicatively coupled to PE router 10, a MAC address for each such host device, the originating PE router IP address associated with each such host device, a sequence number associated with each such host device, and/or a multicast group list of multicast groups of interest to each such host device. Table 1 is an example of an HMT table.

TABLE 1

Host Mobility Tracking Table

| DUT | Host MAC | Originating PE | Seq Num | Mcast Group-List |
|---|---|---|---|---|
| PE router 10 | Host 8 - 01:02:03:04:11:11 | 192.168.1.1 | 457890 | G1, G2, G4, G8 |
| PE router 10 | Host 9 - 01:02:03:03:11:11 | 192.168.1.1 | 37823 | G7, G8 |
| PE router 10 | Host 11 - 01:02:03:02:11:11 | 192.168.1.1 | 23899 | G2, G9 |

When PE router 10 (which may be an example of PE router 10C) receives a Type-2 route for host 8 from a different PE router, for example, PE router 10D, with a higher sequence number, PE router 10 determines that host 8 has moved. For example, PE router 10 may compare the sequence number in the Type-2 route having the same MAC address as an entry in HMT table 218 and if the sequence number in the Type-2 route is higher than the sequence number stored in HMT table 218, PE router 10 may determine that host 8 has moved on. In some examples, in addition to or in lieu of use a sequence number carried in a MAC mobility community of a Type-2 route, a new sequence number may be assigned and be carried in a separate Host Mobility community of a Type-6 route as described above. In some examples, the techniques of this disclosure may apply to unicast traffic as well as multicast traffic.

In examples where host 8 moves from one L2 port to another L2 port of a same PE router 10 and the L2 ports are multi-homed on a same VLAN, the Type-2 route of PE router 10 may be updated with a different ESI. Based on the different ESI (which may be tracked in HMT table 218), PE router 10 may determine that host 8 has moved. In examples where, host 8 moves from one L2 port to another L2 port and the L2 ports are single-homed on a same VLAN, PE router 10 may employ a port tracking scheme and include port information in HMT table 218. In this manner, when host 8 moves from one port to another port, PE router 10 may determine that host 8 has moved. In examples where host 8 moves from one VLAN to another VLAN, PE router 10 may generate a new Type-2 route the MAC associated with host 8. PE router 10 may determine that the new Type-2 route includes a higher sequence number than that stored in HMT table 218, and in that manner determine that host 8 has moved.

HMT table 218 may be used, not only to determine when a host device has moved on, but also when determining whether another host device coupled to PE router 10C is an interested host device in a multicast group to which host 8 was also interested. For example, once PE router 10 determines a host device has moved on, such as host 8, PE router 10 may fetch the <Mcast-Grp-List> from HMT table 218. For each multicast group Gin the <Mcast-Grp-List>, PE router 10 may determine whether there are other host devices interested in the multicast group G based on entries in HMT table 218. For example, if the entries in Table 1 above are entries in HMT table 218, host 9 (not depicted) is interested in multicast group G8 and host 11 (not depicted) is interested in multicast group G2. Host 8 was interested in both multicast group G2 and multicast group G8. However, host 8 was interested in multicast groups G1 and G4 in which neither host 9 nor host 11 are interested. If there are other host devices interested in the multicast group (e.g., multicast group G2 or multicast group G8), PE router 10 may not clean up that particular multicast group. For example, PE router 10 may not update the state of the multicast group to indicate there are no interested host devices on access network 14C (in the case that PE router 10 is an example of PE router 10C).

In some examples, if there are no other host devices interested in a particular multicast group (e.g., multicast group G1 or G4) based on entries in HMT table 218, PE router 10 may send out an IGMP LMQ (Last Member Query) for that multicast group G on a first access network of PE router 10 (e.g., access network 14C in the case that PE router 10 is an example of PE router 10C) to solicit IGMP reports from other host devices on the first access network. If an IGMP report is received indicating a host device is interested in multicast group G, PE router 10 may not clean up the state of multicast group G. If an IGMP report is not received, PE router 10 may proceed with the state cleanup of multicast group G. During the cleanup, PE router 10 may clean up the local IGMP snooping control plane and forwarding state and withdraw the formerly originated Type-6 SMET route. Ingress PE router 10A, on receiving this Type-6 route, may remove the VTEP from ingress PE router 10A's outgoing list for multicast group G.

In some examples, PE router 10 may start LMQ timer 210 (e.g., which may have a default of 1 second) when or approximately when PE router 10 sends out the IGMP LMQ. In such an example, if an IGMP report is received indicating a host device is interested in multicast group G before LMQ timer 210 expires, PE router 10 may not clean up the state of multicast group G. If an IGMP report is not received prior to LMQ timer 210 expiring, PE router 10 may proceed with the state cleanup of multicast group G as discussed above.

In this manner, upon detection of a host device move, e.g., host 8, PE router 10 may check for the multicast groups for which host 8 was interested and clean up states for relevant multicast groups after ensuring that there are no other host devices on the first access network interested in the relevant multicast groups.

For example, PE router 10 may walk through the list of multicast groups that host 8 was listening to when cleaning up, checking if there are other interested host devices on the first access network of PE router 10 for each multicast group in which host 8 was interested. In some examples, LMQ timer 210 may not be used.

The following pseudocode may be a non-limiting example implementation of techniques of this disclosure:

```
if (Type-2 route received for MAC-M1) {
    if (M1 exists in my HMT) {
        if (incoming M1's sequence number is greater than the one in HMT) {
            Deduce that M1 has moved out;
            Perform Conditional Multicast Cleanup of states for M1;
        }
evpn_mcast_conditional_cleanup (Mac M1) {
    grp_list = evpn_mcast_fetch_grp_list(M1);
    for (each G in grp_list) {
        remove G from M1's grp_list;
        if (evpn_any_hosts_present_for_G_in_my_HMT( )) {
            nothing to do;
        } else {
            Send LMQ for G and start LMQ timer for G;
            if (report received for G before timer expiry) {
                nothing to do;
            } else {
                clean up local snooping state;
                withdraw Type-6 SMET route;
            }
```

Figure 3:
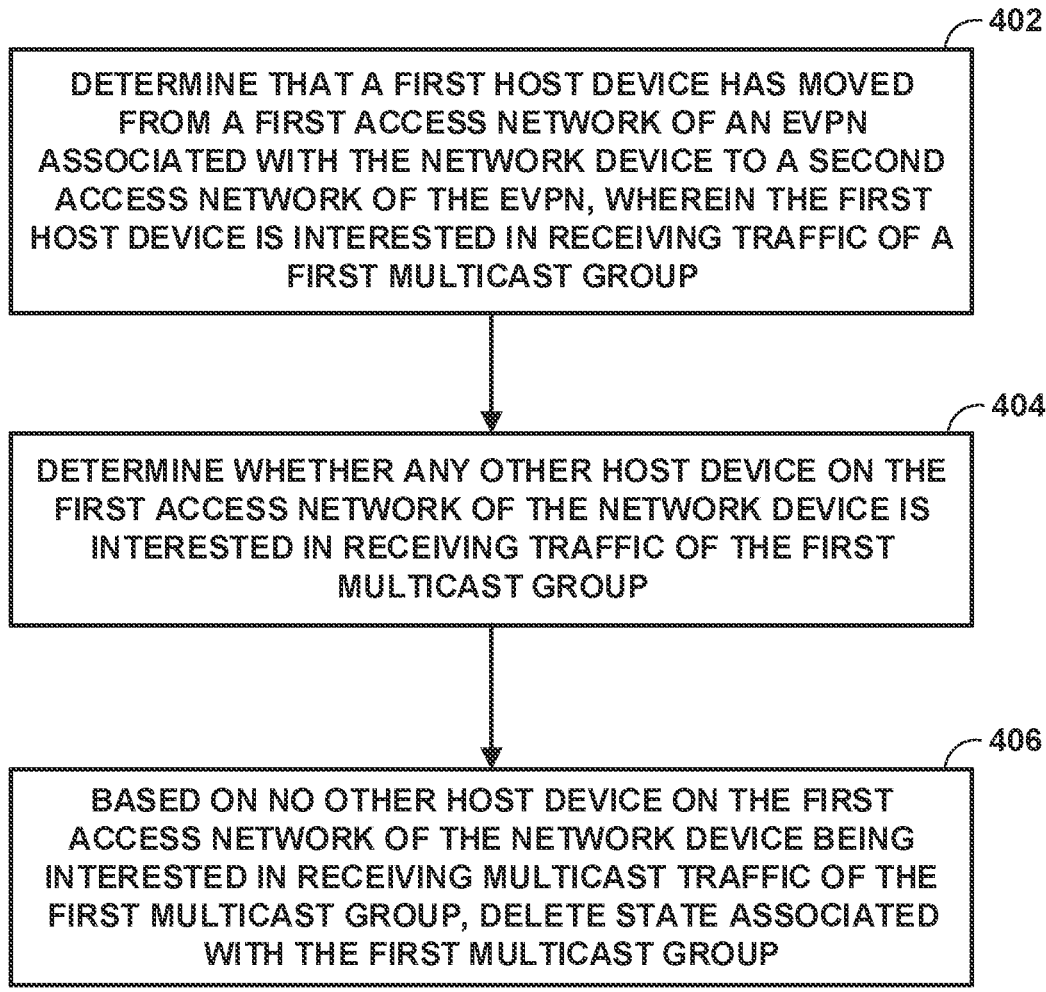
FIG. 3 is a flow diagram illustrating example IGMP host mobility techniques according to this disclosure.

FIG. 3 is a flow diagram illustrating example IGMP host mobility techniques according to this disclosure. PE router 10 may determine that a first host device (e.g., host 8 of FIGS. 1A-C) has moved from a first access network (e.g., access network 14C) of EVPN 20 associated with the network device (e.g., PE router 10) to a second access network (e.g., access network 14D) of EVPN 20, wherein the first host device is interested in receiving traffic of a first multicast group. For example, PE router 10 may receive a Type-2 route from another PE router (e.g., PE router 10D) including a MAC address identifying the first host device and including a higher sequence number than an entry for the first host device in HMT table 218 of PE router 10. This Type-2 route with a higher sequence number for the first host device may be indicative of the first host device having moved from the first access network (e.g. access network 14C) associated with the network device (e.g., PE router 10) to a second access network of the PE router sending the Type-2 route rather than PE router 10.

PE router 10 may determine whether any other host device on the first access network of the network device is interested in receiving traffic of the first multicast group. For example, PE router 10 may determine whether any other host device listed in HMT table 218 and on the first access network (e.g., access network 14C) is interested in receiving traffic of the first multicast group based on entries in HMT table 218. In some examples, PE router 10 may send out an IGMP LMQ on the access network of PE router 10 and determine whether any IGMP reports indicating an interest in the first multicast group are received. In some examples, PE router 10 may employ LMQ timer 210 when sending out the IGMP LMQ.

Based on no other host device on the first access network of the network device being interested in receiving multicast traffic of the first multicast group, PE router 10 may delete state associated with the first multicast group. For example, PE router 10 may include control plane 204 and forwarding plane 222. In some examples, as part of deleting state associated with the first multicast group, PE router 10 may perform cleanup of local IGMP snooping state for the first multicast group on control plane 204 and delete forwarding state information for the first multicast group in FIB table 224 of forwarding plane 222.

In some examples, based on no other host device communicatively coupled to the network device being interested in receiving multicast traffic of the first multicast group, PE router 10 may withdraw a Selective Multicast Ethernet Tag (SMET) Ethernet virtual private network (EVPN) type-6 route associated with the first multicast group from ingress PE router 10A such that the network device will no longer receive traffic of the first multicast group from ingress PE router 10A.

In some examples, for each multicast group for which the first host device is interested in receiving traffic, PE router 10 may determine whether any other host device coupled to the network device is interested in receiving traffic of the respective multicast group and based on no other host device communicatively coupled to the network device being interested in receiving traffic of the respective multicast group, deleting state associated with the respective multicast group.

In some examples, PE router 10 may include a host mobility tracking table. In some examples, for at least one of the respective multicast groups, there is at least one other host device interested in receiving traffic of the at least one of the respective multicast groups, and PE router 10 may remove the at least one of the respective multicast groups from a multicast group list associated with the first host device stored in HMT table 218, and refrain from deleting state associated with the at least one of the respective multicast groups. In some examples, as part of determining whether any other host device on the first access network of the network device is interested in receiving traffic of the first multicast group, PE router 10 may determine whether any other host device is associated with the first multicast group in HMT table 218. In some examples, as part of determining that the first host device has moved from the first access network of the first PE router to the second access network, PE router 10 may receive a control message from a second PE router associated with the second access network of the EVPN, the control message including a media access control (MAC) address associated with the first host device and a first sequence number associated with the first host device, and determine that the first sequence number is higher than a second sequence number associated with the first host device stored in HMT table 218 at the first PE router (e.g., PE router 10). In some examples, the control message may include a Type-2 route. In some examples, the control message may include a Type-6 route.

In some examples, as part of determining whether any other host device communicatively coupled to the network device is interested in receiving traffic of the first multicast group, PE router 10 may send an IGMP last member query (LMQ) for the first multicast group on the first access network of the network device, and determine that no other host device on the first access network of the network device is interested in receiving traffic of the first multicast group based on not receiving an IGMP report from any host device indicative of a respective host device being interested in receiving traffic of the first multicast group in response to the IGMP LMQ.

In some examples, as part of determining whether any other host device on the first access network of the network device is interested in receiving traffic of the first multicast group, PE router 10 may set an LMQ timer and determine that no other host device on the first access network of the first PE router is interested in receiving traffic of the first multicast group based on not receiving an IGMP report from any host device indicative of a respective host device being interested in receiving traffic of the first multicast group prior to the LMQ timer expiring.

In accordance with the techniques of this disclosure, needless multicast traffic forwarding is avoided, thereby conserving core-bandwidth, access-bandwidth, ingress replication resources, as well as egress processing resources. The techniques of this disclosure may be used in single-home and/or multi-homed scenarios. In case of multi-homed scenarios, based on Type-7 and Type-2 routes, each of the PEs in the multi-homed peer set, may track the IGMP host devices, the respective MACs, and the Group-List in which the hosts are interested.

In some examples, the techniques of this disclosure may be applicable to scenarios where a host device moves across L2-ports/ESI on a same PE router. In some examples, the techniques of this disclosure are applicable to scenarios where a host device moves across VLANs, whether or not the VLANs are on the same PE router or different PE routers.

In some examples, the techniques can be enhanced to have a separate IGMP host mobility community attribute to detect the movement of IGMP host devices alone. This separate community attribute may help limit the mobility detection to only multicast host devices. This IGMP host mobility community attribute may be carried in Type-6 SMET routes and may contain the MAC address that sent the report and the sequence number.

In some examples, the techniques of this disclosure may be used with IGMPv3, IGMPv2, Multi-Listener Discover (MLD) host devices, Centrally-Routed Bridging (CRB) and/or Optimized Inter-Subnet Multicast (OISM).

The techniques described in this disclosure may be implemented, at least in part, in hardware, software, firmware or any combination thereof. For example, various aspects of the described techniques may be implemented within processing circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   determining, by a first provider edge (PE) router of a plurality of PE routers within an Ethernet virtual private network (EVPN), that a first host device has moved from a first access network of the EVPN associated with the first PE router to a second access network of the EVPN, wherein the first host device is interested in receiving traffic of a first multicast group and wherein determining that the first host device has moved from the first access network of the first PE router to the second access network comprises:
       receiving, by the first PE router, a control message from a second PE router associated with the second access network of the EVPN, the control message including a media access control (MAC) address associated with the first host device and a first sequence number associated with the first host device; and
       determining, by the first PE router, that the first sequence number is higher than a second sequence number associated with the first host device stored in a host mobility tracking table at the first PE router;
   determining, by the first PE router, whether any other host device on the first access network of the first PE router is interested in receiving traffic of the first multicast group; and
   based on no other host device on the first access network of the first PE router being interested in receiving multicast traffic of the first multicast group, deleting, by the first PE router, state associated with the first multicast group.

2. The method of claim 1, wherein deleting state associated with the first multicast group comprises performing cleanup of local Internet Group Management Protocol (IGMP) snooping state for the first multicast group on a control plane of the first PE router and deleting forwarding state for the first multicast group on a forwarding plane of the first PE router.

3. The method of claim 1, further comprising, based on no other host device on the first access network of the first PE router being interested in receiving multicast traffic of the first multicast group:

withdrawing a Selective Multicast Ethernet Tag (SMET) Ethernet virtual private network (EVPN) type-6 route associated with the first multicast group from an ingress PE router such that the first PE router will no longer receive traffic of the first multicast group from the ingress PE router.

4. The method of claim 1, wherein the first multicast group is one of a plurality of multicast groups of which the first host device is interested in receiving traffic, the method further comprising:
for each multicast group for which the first host device is interested in receiving traffic, determining, by the first PE router, whether any other host device coupled to the first PE router is interested in receiving traffic of a respective multicast group; and
based on no other host device on the first access network of the first PE router being interested in receiving traffic of the respective multicast group, deleting state associated with the respective multicast group.

5. The method of claim 4, wherein for at least one of the respective multicast groups, there is at least one other host device interested in receiving traffic of the at least one of the respective multicast groups, further comprising:
removing the at least one of the respective multicast groups from a multicast group list associated with the first host device stored in the host mobility tracking table at the first PE router; and
refraining from deleting state associated with the at least one of the respective multicast groups.

6. The method of claim 1, wherein determining whether any other host device on the first access network of the first PE router is interested in receiving traffic of the first multicast group comprises:
determining, by the first PE router, whether any other host device is associated with the first multicast group in the host mobility tracking table stored at the first PE router.

7. The method of claim 1, wherein determining whether any other host device on the first access network of the first PE router is interested in receiving traffic of the first multicast group comprises:
sending, by the first PE router, an Internet Group Management Protocol (IGMP) last member query (LMQ) for the first multicast group on the first access network of the first PE router; and
determining, by the first PE router, that no other host device on the first access network of the first PE router is interested in receiving traffic of the first multicast group based on the first PE router not receiving an IGMP report from any host device indicative of a respective host device being interested in receiving traffic of the first multicast group in response to the IGMP LMQ.

8. The method of claim 7, wherein determining whether any other host device on the first access network of the first PE router is interested in receiving traffic of the first multicast group further comprises:
setting, by the first PE router, an LMQ timer; and
determining, by the first PE router, that no other host device on the first access network of the first PE router is interested in receiving traffic of the first multicast group based on the first PE router not receiving the IGMP report from any host device indicative of a respective host device being interested in receiving traffic of the first multicast group prior to the LMQ timer expiring.

9. The method of claim 1, wherein the control message comprises a Type-2 route.

10. The method of claim 1, wherein the control message comprises a Type-6 route.

11. A network device, the network device comprising:
memory configured to store packet data and a mobility tracking table; and
processor circuitry coupled to the memory, the processor circuitry being configured to:
determine that a first host device has moved from a first access network of an Ethernet Virtual Private Network (EVPN) associated with the network device to a second access network of the EVPN, wherein the first host device is interested in receiving traffic of a first multicast group and wherein as part of determining that the first host device has moved from the first access network of the first PE router to the second access network the processor circuitry is configured to:
receive a control message from a second PE router associated with the second access network of the EVPN, the control message including a media access control (MAC) address associated with the first host device and a first sequence number associated with the first host device; and
determine that the first sequence number is higher than a second sequence number associated with the first host device stored in the mobility tracking table;
determine whether any other host device on the first access network of the network device is interested in receiving traffic of the first multicast group; and
based on no other host device on the first access network of the network device being interested in receiving multicast traffic of the first multicast group, delete state associated with the first multicast group.

12. The network device of claim 11, further comprising:
a control plane; and
a forwarding plane,
wherein as part of deleting state associated with the first multicast group, the processing circuitry is configured to perform cleanup of local Internet Group Management Protocol (IGMP) snooping state for the first multicast group on the control plane and delete forwarding state for the first multicast group on the forwarding plane.

13. The network device of claim 11, wherein the processing circuitry is further configured to:
based on no other host device the first access network of the network device being interested in receiving multicast traffic of the first multicast group,
withdraw a Selective Multicast Ethernet Tag (SMET) Ethernet virtual private network (EVPN) type-6 route associated with the first multicast group from an ingress PE router such that the network device will no longer receive traffic of the first multicast group from the ingress PE router.

14. The network device of claim 11, wherein the first multicast group is one of a plurality of multicast groups of which the first host device is interested in receiving traffic, and wherein the processing circuitry is further configured to:
for each multicast group for which the first host device is interested in receiving traffic, determine whether any other host device coupled to the network device is interested in receiving traffic of a respective multicast group; and
based on no other host device on the first access network of the network device being interested in receiving traffic of the respective multicast group, deleting state associated with the respective multicast group.

15. The network device of claim 14,
wherein for at least one of the respective multicast groups, there is at least one other host device interested in receiving traffic of the at least one of the respective multicast groups, and wherein the processing circuitry is further configured to:
  remove the at least one of the respective multicast groups from a multicast group list associated with the first host device stored in the host mobility tracking table; and
  refrain from deleting state associated with the at least one of the respective multicast groups.

16. The network device of claim 11,
wherein as part of determining whether any other host device on the first access network of the network device is interested in receiving traffic of the first multicast group, the processing circuitry is configured to:
  determine whether any other host device is associated with the first multicast group in the host mobility tracking table.

17. The network device of claim 11, wherein as part of determining whether any other host device on the first access network of the network device is interested in receiving traffic of the first multicast group, the processing circuitry is configured to:
  send an Internet Group Management Protocol (IGMP) last member query (LMQ) for the first multicast group on the first access network of the network device; and
  determine that no other host device on the first access network of the network device is interested in receiving traffic of the first multicast group based on not receiving an IGMP report from any host device indicative of a respective host device being interested in receiving traffic of the first multicast group in response to the IGMP LMQ.

18. The network device of claim 17, wherein as part of determining whether any other host device on the first access network of the network device is interested in receiving traffic of the first multicast group, the processing circuitry is configured to:
  set an LMQ timer; and
  determine that no other host device on the first access network of the network device is interested in receiving traffic of the first multicast group based on not receiving the IGMP report from any host device indicative of a respective host device being interested in receiving traffic of the first multicast group prior to the LMQ timer expiring.

19. A non-transitory computer-readable medium comprising instructions that, when executed, causes a first provider edge (PE) router to:
  determine that a first host device has moved from a first access network of an Ethernet virtual private network (EVPN) associated with the first PE router to a second access network of the EVPN, wherein the first host device is interested in receiving traffic of a first multicast group and wherein to determine that the first host device has moved from the first access network of the first PE router to the second access network the instructions cause the first PE router to:
    receive a control message from a second PE router associated with the second access network of the EVPN, the control message including a media access control (MAC) address associated with the first host device and a first sequence number associated with the first host device; and
    determine that the first sequence number is higher than a second sequence number associated with the first host device stored in the mobility tracking table;
  determine whether any other host device on the first access network of the first PE router is interested in receiving traffic of the first multicast group; and
  based on no other host device on the first access network of the first PE router being interested in receiving multicast traffic of the first multicast group, delete state associated with the first multicast group.

* * * * *